(12) United States Patent
Kerspe et al.

(10) Patent No.: US 10,062,937 B2
(45) Date of Patent: Aug. 28, 2018

(54) BATTERY HOUSING

(71) Applicants: KOENIG METALL GmbH & Co. KG, Gaggenau (DE); Jobst H. Kerspe, Mauer (DE)

(72) Inventors: Jobst H. Kerspe, Mauer (DE); Michael Fischer, Gaggenau (DE)

(73) Assignees: KOENIG METALL GmbH & Co. KG, Gaggenau (DE); Jobst H. Kerspe, Mauer (DE)

( * ) Notice: Subject to any disclaimer, the term of this patent is extended or adjusted under 35 U.S.C. 154(b) by 497 days.

(21) Appl. No.: 14/824,283

(22) Filed: Aug. 12, 2015

(65) Prior Publication Data

US 2016/0049706 A1  Feb. 18, 2016

(30) Foreign Application Priority Data

Aug. 14, 2014 (DE) ................... 10 2014 111 645

(51) Int. Cl.
| | |
|---|---|
| H01M 10/50 | (2006.01) |
| H01M 10/6557 | (2014.01) |
| H01M 10/625 | (2014.01) |
| H01M 2/02 | (2006.01) |
| H01M 10/6555 | (2014.01) |

(52) U.S. Cl.
CPC ..... *H01M 10/6557* (2015.04); *H01M 2/0237* (2013.01); *H01M 10/625* (2015.04); *H01M 10/6555* (2015.04); *H01M 2220/20* (2013.01)

(58) Field of Classification Search
CPC ......... H01M 10/6557; H01M 10/6555; H01M 2/0237; H01M 10/625; H01M 2220/20; H01M 10/655; H01M 2/037

USPC ........................................................ 429/120
See application file for complete search history.

(56) References Cited

U.S. PATENT DOCUMENTS

| | | | |
|---|---|---|---|
| 3,110,633 A | 11/1963 | Bachmann | |
| 4,332,866 A | 6/1982 | Jacquelin et al. | |
| 5,158,841 A * | 10/1992 | Mennicke | H01M 10/3909 220/592.2 |
| 5,607,787 A * | 3/1997 | Wedlake | H01M 2/1094 429/120 |
| 2012/0003515 A1 * | 1/2012 | Eisenhour | H01M 10/625 429/62 |

(Continued)

FOREIGN PATENT DOCUMENTS

| | | |
|---|---|---|
| DE | 40 13 269 A1 | 10/1991 |
| DE | 103 19 350 B4 | 11/2004 |

(Continued)

*Primary Examiner* — Gary Harris
(74) *Attorney, Agent, or Firm* — Collard & Roe, P.C.

(57) ABSTRACT

A battery housing for accommodating one or more cell blocks of a battery provides the interstice between an outer wall and an inner wall with supported vacuum insulation composed of a porous support material. This vacuum insulation can be switched between an insulation state and a transient state. The interstice is additionally provided with cooling elements. This battery housing offers crash-safe accommodation of the cell blocks accommodated in the battery housing, for one thing, and furthermore offers passive or controllable and/or regulatable thermal management to the effect that the cell blocks accommodated in the battery housing can be cooled or heated as needed, in any case kept in a permissible temperature range in every operating state.

24 Claims, 3 Drawing Sheets

(56) References Cited

U.S. PATENT DOCUMENTS

2013/0004808 A1* 1/2013 Tschismar ............ H01M 2/1072
 429/50
2015/0035370 A1* 2/2015 Wyatt ................ H01M 10/625
 307/77

FOREIGN PATENT DOCUMENTS

| EP | 0 588 004 A1 | 3/1994 |
|----|--------------|--------|
| FR | 2 474 195 A1 | 7/1981 |
| JP | 2001-223035 A | 8/2001 |
| JP | 2002-063947 A | 2/2002 |
| JP | 2011-207321 A | 10/2011 |
| JP | 2013-097891 A | 5/2013 |
| WO | 2013/061132 A2 | 5/2013 |

* cited by examiner

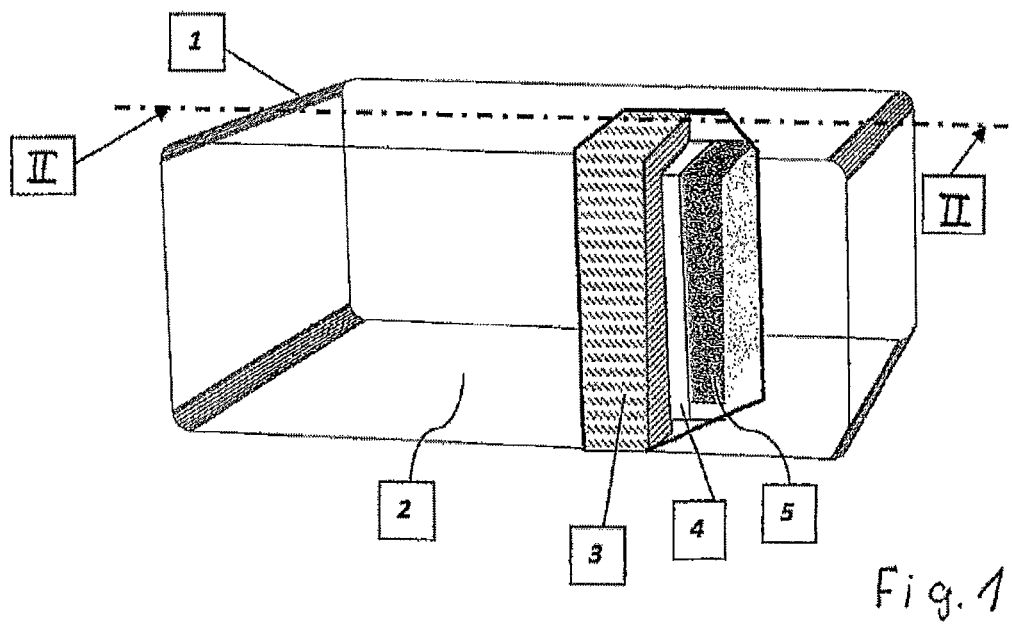
Fig. 1
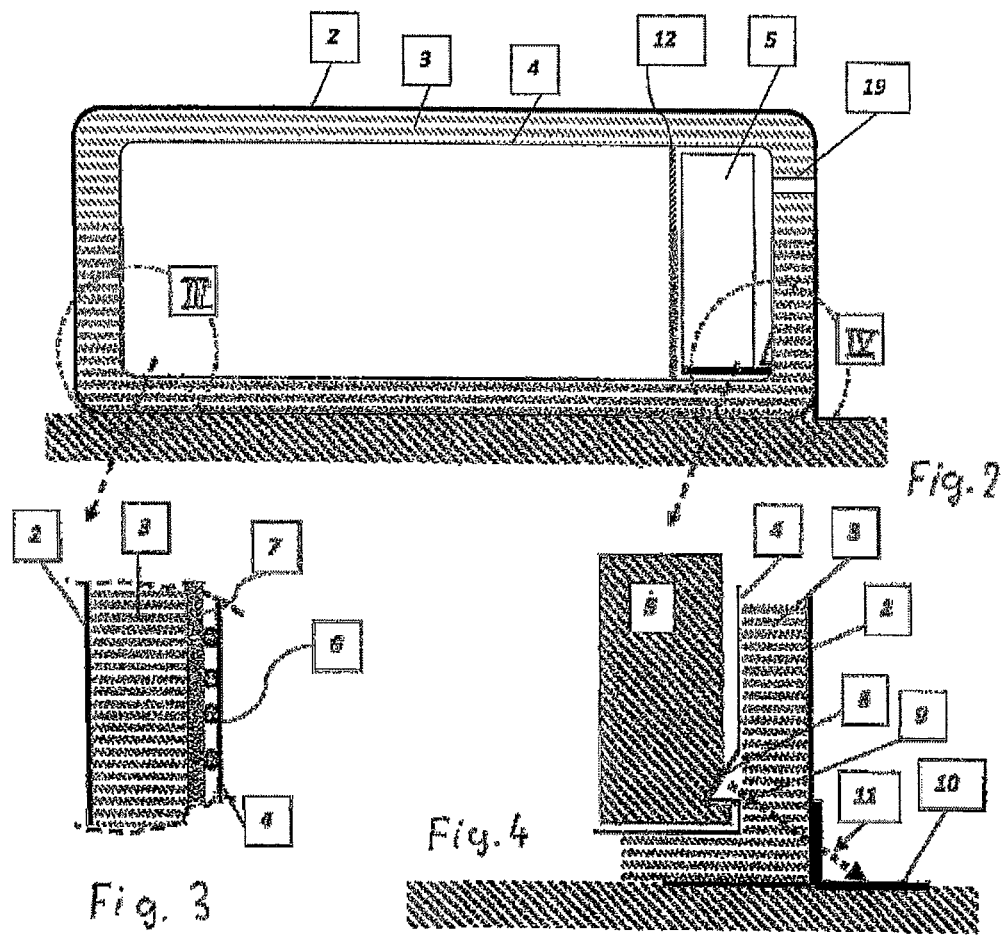
Fig. 2
Fig. 3
Fig. 4

BATTERY HOUSING

CROSS REFERENCE TO RELATED APPLICATIONS

Applicant claims priority under 35 U.S.C. § 119 of German Application No. 10 2014 111 645.3 filed Aug. 14, 2014, the disclosure of which is incorporated by reference.

BACKGROUND OF THE INVENTION

1. Field of the Invention

The invention relates to a battery housing.

2. Description of the Related Art

The demands on battery housings are quite comprehensive. In the case of mobile applications, for example in the automotive sector, the battery cells or modules stored in the housing must be mechanically protected, for one thing against the vibration stress during usual driving operation. The battery cells or modules must also be mechanically protected in the event of damage to the vehicle and therefore perhaps also to the battery housing in the event of an accident. In many countries, complete encapsulation of the cells of a battery is furthermore required, in order to prevent battery fluids or reaction products from leaking in the event of damage, or to prevent the formation of reaction products. Ultimately, encapsulation also serves for fire protection, which is particularly relevant in the vehicle sector.

Particularly in connection with increasing electromobility, additional demands are made on such battery housings, in order to improve the useful lifetime but also the performance capacity of the batteries used. Even today, it must be ensured that the battery cells accommodated in the battery housing do not cool down to such an extent that the electrochemical processes that occur in the battery freeze. Furthermore, however, the battery housing must also ensure that any excess heat that might occur, for example while carrying out a quick-charging process of the battery or in the event of increased consumption of power from the battery, is reliably dissipated. In summary, these demands mean that within a battery housing that meets current requirements, the temperature must be maintained within an average permissible range, in other words is not allowed to drop below a defined lower temperature, but also not allowed to exceed a defined upper temperature limit. In the future, it will therefore be necessary to provide intelligent battery housings with intelligent temperature management.

From the state of the art, it is known to connect individual battery cells to form groups and to combine them into modules. These modules are mostly provided with simple thermal insulation, wherein this insulation mostly involves pre-molded polystyrene housings. To dissipate heat, cooling surfaces between the individual cells, through which cooling water flows, can be integrated into these housings. In general, in the automotive sector multiple such modules are combined to form a total battery. This total battery is then often installed into a trough-shaped battery housing, which is supposed to ensure fixation of the total battery in the vehicle, for one thing, and is supposed to provide the required crash safety, for another thing.

For this purpose, a battery housing for accommodating a battery module of a vehicle is previously known from DE 40 13 269 A1, wherein this battery housing is configured as a rigid structural element, and the wall elements of the battery housing are configured in double-walled manner, in each instance, i.e. in a sandwich design with an inner wall and an outer wall disposed at a distance from the former. The interstice between the inner and outer walls is filled with a porous insulation material in this embodiment, in each instance, and subsequently evacuated. It is doubtful, however, whether this porous insulation material is configured to be pressure-resistant, and accordingly whether the previously known battery housing actually has the required crash safety. Furthermore, cooling of the storage cells that form the battery, by means of latent heat storage units, is not implemented in the wall of the battery housing. Instead, the latent heat storage units used for cooling are disposed in the interstices between the storage cells.

A further battery housing for accommodating a battery module of a vehicle is known from EP 0 588 004 A1. In this connection, the battery housing is configured as a rigid structural element. The wall elements of the battery housing are configured in double-walled manner, in each instance, i.e. also in a sandwich design with an inner wall and an outer wall disposed at a distance from the former. The interstice between these inner and outer walls is filled with a porous support material. The cooling elements used for cooling are also disposed in this interstice. This housing, however, is irreversibly connected with the battery cell disposed in the housing, which is produced in a layer structure, comprising, from the outside to the inside, an insulation layer, a heat storage layer, and a cooling layer.

In this connection, a battery box module for a vehicle, particularly for a motor vehicle, is also known from DE 103 19 350 B4. This battery box module is a mechanically robust box for accommodating a vehicle battery and a lid that closes the box and can be released from the box, wherein the box has a trough-like double-wall design with switchable vacuum insulation, which can be switched into a thermal transient state and a thermal insulation state, wherein the module additionally comprises an electrical controller, which is responsible for switching the vacuum insulation.

The trough-like design of the battery box module is supposed to contribute to making it possible to capture at least small amounts of leaking battery acid.

Switchable vacuum insulation is supposed to be understood to mean that when the vacuum insulation is in a non-switched or current-free state, the insulation state of the battery housing is maintained, in other words heat insulation of the battery is present. In addition, however, the vacuum insulation can be switched as a function of the battery temperature and/or of the ambient temperature and/or of the power intensity or other external demands, and it can thereby be put into a thermal transient state.

For this purpose, an activatable material is disposed in the double wall of the battery box, which is understood to mean that a heat insulation material, for example tempered glass fiber board, is introduced into the double wall of the previously known battery box module, and furthermore the inner space is evacuated, in order to thereby produce low heat conductivity.

In addition, a metal hybrid getter is integrated into the interior of this insulation. This getter is able to store hydrogen at temperatures below approximately 100° C. When the getter is heated, a hydrogen atmosphere can thereby be produced in the heat insulation. This hydrogen atmosphere, in combination with the glass fiber board, leads to a significant increase in heat conductivity. This state is then referred to as a transient state of the heat insulation.

SUMMARY OF THE INVENTION

Proceeding from this state of the art, the use of a multifunctional battery housing is proposed within the scope of the invention, which housing is improved, in terms of design, as compared with the state of the art, and particularly allows improved thermal management for the battery modules accommodated in the battery housing.

For this purpose, the invention provides a battery housing in which one or more battery modules connected with one another can be accommodated, so that separately housing the individual battery modules can be eliminated. The battery housing itself is configured as a high-strength and rigid structural element, so that in this regard, the crash safety required in the automotive sector as well as the required leak protection are present. In this connection, it is possible to do without voluminous insulation of each individual battery module. Because of the great rigidity of the housing, fixation of the individual battery modules within the housing can be structured in compact and central manner. Any acceleration and weight forces that occur are introduced into the housing structure on the inside, and are transferred to the attachment points in the vehicle by way of the walls, without additional support elements or bearing elements. Furthermore, in contrast to the state of the art, cooling elements are additionally integrated into the wall elements of the battery housing, so that is necessary, dissipation of excess heat by means of the battery box housing is also made possible or supported.

In a concrete embodiment, the cooling elements, for example cooling channels, are integrated into the inner wall of the battery housing or at least disposed in the interstice between the wall elements, in a region adjacent to the inner wall. In this way, it is ensured that the cooling effect is increased, by placing the cooling elements in the immediate vicinity of the battery modules accommodated in the housing.

In a further embodiment, the cooling elements are connected with a higher-level cooling system of a vehicle, for example, wherein the connections are passed into the battery housing in vacuum-tight manner, in order to maintain the vacuum insulation of the battery housing. This arrangement has the advantage, for one thing, that an additional cooling system does not have to be made available specifically for the battery housing, and furthermore allows central control of the cooling of the battery housing, for example as a function of the respective vehicle properties. Thus, for example, cooling of the battery housing can be turned on when a higher temperature of the battery modules accommodated in the housing is expected due to the engine output or also of the current energy requirement of the vehicle.

The double-walled battery housing is filled with a porous support material in the interstice between the respective inner and outer walls, into which material a hybrid storage material or a getter is integrated. In the event of extreme stress on the batteries accommodated in the battery housing, a large portion of the waste heat is dissipated by way of the entire housing surface. If a defined temperature level is exceeded, or also in the event of heating of the integrated hybrid storage material or of the getter, hydrogen or another suitable gas is emitted into the support material. In this way, the heat conductivity of the support material is significantly increased, so that in this case, heat dissipation via the battery housing is made possible, in the interest of cooling the battery modules accommodated in the battery housing. In the case of an appropriate design, in this way a passive system of heat dissipation can be implemented, in that the supported vacuum insulation (GVI) is automatically put into a thermal transient state within the interstices of the double-walled battery housing when a defined temperature level is reached.

In yet another advantageous embodiment, latent heat storage elements can be additionally integrated into the interstice of the battery housing, in other words into the porous support material, or, additionally or alternatively, latent heat storage elements, then preferably as micro-encapsulated elements, can be integrated into the cooling fluid of the cooling elements. In this way, excess heat can first be given off to the said heat storage units, without active cooling being required for this purpose, and, vice versa, excess heat can be used to heat the battery, but, if necessary, also a vehicle interior, at low ambient temperatures. For the case that the latent heat storage elements are integrated directly into the cooling fluid, it is not even necessary to provide an additional component within the battery housing for this purpose.

In a concrete embodiment, the heat storage elements are filled with a phase change material, called a "Phase-Change-Material" (PCM), in other words materials that at first absorb heat as a function of the ambient temperature, and, when the ambient temperature drops below a defined temperature level, give this heat off again. Here, too, this system is therefore a passive system that absorbs or gives off heat as a function of the ambient temperature, and can therefore be used not only for cooling but also for heating the battery modules integrated into the battery housing.

In an advantageous further development, the battery housing according to the invention is additionally provided with a controller and/or regulator for implementing thermal management with regard to the interior temperature of the housing. In this way, it can be ensured, for example, that during heat emission from the latent heat storage units to heat the battery modules accommodated in the battery housing, cooling of the cooling elements integrated into the housing is shut off at the same time.

In a further embodiment, targeted heating of the support material accommodated in the interstice or of the hybrid storage material integrated into this support material or of an integrated getter can take place by the controller and/or regulator described above. In this way, the vacuum insulation of the housing can be switched to the transient state or can be activated again by shutting of the heating process.

In a further embodiment of the thermal management, the integrated controller and/or regulator can be provided with a sensor system for detecting the respective vehicle states of a vehicle, in other words particularly the current engine output and/or the current energy demand of the vehicle, or detecting the interior temperature of the battery housing, and thereby the interior temperature of the battery housing according to the invention can be controlled or regulated as a function of the current battery state and/or vehicle state.

In this connection, the battery housing can be configured to be completely encapsulated, according to a preferred embodiment.

Alternatively, however, an embodiment is also conceivable, in which the battery housing is reversibly completely encapsulated, in other words can be opened on one side of the housing, if necessary, if maintenance is required, and subsequently can be closed again and can then be evacuated again, in order to restore the vacuum insulation. For this purpose, the battery housing is sealed by way of two flanges disposed one behind the other, namely one for the inner and one for the outer wall, in the region of the wall element to be opened.

Alternatively, the inner and outer wall of the battery housing can also be connected with one another by way of flanged elements. The flanges are configured in such a manner that this connection region can be opened up and closed again multiple times. The evacuation that is required after opening and renewed closing of the battery housing, in each instance, takes place by way of a vacuum port integrated into the outer wall of the battery housing, in connection with a suitable lock system. In this way, as well, the battery housing can be opened if required, for example in order to remove and replace defective battery modules.

In yet another alternative embodiment, the battery housing can also be configured in two parts, i.e. in the form of two separate half-shells, which are connected with one another with force fit in the region of their abutting edges. In this regard, the formation of the connection between the abutting edges of the half-shells participating in the connection ideally takes place with the interposition of a sealing element, in order to maintain the heat insulation of the battery housing in this region, as well.

In an advantageous further development of this idea of the modularly implemented structure of a closed battery housing composed of multiple half-shells, multiple cylindrical half-shells can also be connected with one another as described above. Half-shells that are open only on one side are connected at the two outer sides of the battery housing. In this way, as a whole, once again a completely closed battery housing is formed, wherein the individual half-shells are connected with one another with force fit, by suitable connection elements.

In the case of such modularly constructed battery housings, it is advantageous if corresponding plug-in couplings are provided in the region of the abutting edges of the half-shells to be connected with one another, in order to connect the half-shells to a common coolant supply, electrical feed lines for integrated heating elements, etc., for example.

In this regard, the individual half-shells can also be opened, if necessary, by way of an integrated vacuum port in combination with a suitable lock system, and subsequently closed again after renewed evacuation, for example in order to perform maintenance work in this way.

Furthermore, all electrical feed lines, heating lines, measurement lines or lines for the cooling fluid feed that might be necessary are connected with the inner and outer wall of the battery housing in vacuum-tight manner, by means of thin-walled pipes or corrugated bellows.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 1 shows a double-walled battery housing, closed all around, in a fundamental diagram, in perspective;

FIG. 2 is a longitudinal section, indicated in FIG. 1 with II-II, through the housing shown in FIG. 1;

FIG. 3 is a detail, indicated in FIG. 2 with III, of the battery housing shown in FIG. 2, in longitudinal section;

FIG. 4 is a detail, indicated in FIG. 2 with IV, of the battery housing shown in FIG. 2, in longitudinal section;

DETAILED DESCRIPTION OF PREFERRED EMBODIMENTS

Figure 5:
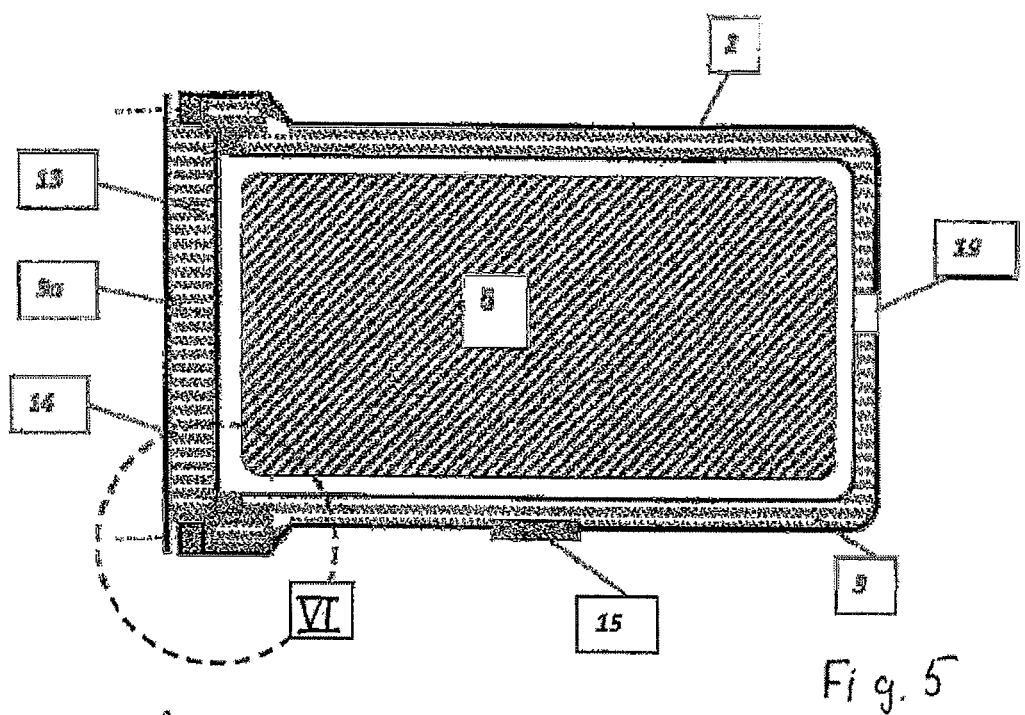
FIG. 5 shows a battery housing provided with a wall to be opened, in longitudinal section.

FIG. 1 shows a battery housing 1 for accommodating one or more battery modules that are connected with one another but not shown in any detail in the drawing. The battery housing 1 is surrounded on all sides by a closed outer wall 2, wherein the wall of the battery housing 1 is structured as a double wall, according to the sectional view integrated into the drawing, in such a manner that a porous support material 3 for forming what is called supported vacuum insulation (abbreviation: GVI) follows the outer wall 2, on its inner side, which insulation is then closed off, relative to the interior of the battery housing 1, by an inner wall 4.

A fiberboard, produced from glass fibers compressed by means of thermal compression, is a possible porous support material 3 for filling the interstice between the outer wall 2 and the inner wall 4, for example, as are pourable fill materials, such as hollow glass microbeads, or an open-cell foam glass granulate. In addition, the interstice is evacuated within the course of the production of the battery housing, so that high-performance vacuum insulation is obtained. According to the detail of the battery housing 1 shown in FIG. 1, the inner wall 4 is then followed by the cell block 5 of a battery module accommodated in the battery housing 1. In this connection, multiple cell blocks or battery modules connected with one another can certainly be accommodated in the battery housing.

FIG. 2 shows the battery housing shown in FIG. 1 in longitudinal section, from which it becomes clear that cooling ribs 12 can additionally be introduced into the battery housing 1, between the individual cell blocks 5. In order to supply the cooling ribs 12 and/or the cooling elements disposed in the housing 1, as a whole, with a cooling fluid, the outer wall 2 has a passage, configured to be vacuum-tight, for the introduction of the coolant into the battery housing 1. For the case that the battery housing 1 is disposed in a vehicle, the coolant can be supplied from the cooling system of the vehicle.

FIG. 3 shows a detail of the structure of the battery housing 1 in an enlarged view. Thus, a latent heat storage unit 7 is at first disposed on the inside of the housing wall of the battery housing 1. Such a latent heat storage unit 7 usually consists essentially of what is called a phase change material (Phase Change Material, abbreviated: PCM), which has the property of absorbing heat at higher temperatures and giving it off again when the temperature drops below a defined level. Because the latent heat storage unit 7 is directly adjacent to the inner wall 4 of the battery housing 1, the heat given off by the integrated battery modules can therefore be directly absorbed by the latent heat storage units 7, or the heat given off by the latent storage units 7 is directly introduced into the interior of the battery housing 1, if applicable. Furthermore, cooling channels 6 that run parallel to one another are integrated into the wall of the battery housing 1, in the interstice between the outer wall 2 and the inner wall 4, once again directly adjacent to the inner wall 4. Here, too, it is ensured that in the case that a cooling fluid flows through the cooling channels 6, direct cooling of the battery modules accommodated in the battery housing 1 is brought about.

FIG. 4 finally shows the fixation of a cell block 5 in the battery housing 1 in a detail view. First of all, a guide rail 8, which projects in the direction of the cell block 5, is formed on, for fixation of the cell block 5 on the inner wall 4. In this regard, the guide rail 8 engages into a corresponding recess 9 to form a shape-fit guide or connection between the cell block 5 and the wall of the battery housing 1. Any forces caused by vibration or braking movements and acting on the battery housing are conducted away into the outer housing attachment 10 of the battery housing 1, for example into the chassis of a vehicle, in accordance with the force or power line 11 shown, so that as a result, secure fixation of the cell blocks 5 within the battery housing 1 is guaranteed.

FIG. 5 shows a battery housing 1, in longitudinal section, in which a wall can be opened for maintenance work, if necessary, for example in order to be able to replace a defective battery module or a defective cell block 5, if necessary. In this regard, this housing is closed off by a lid segment 3a filled with the support material 3. On the inside of the wall, the lid segment 3a is closed off by a flanged lid 13. On the outside of the wall, the lid segment 3a is closed off by an outer flanged lid 14. This battery housing 1 is also provided with a vacuum-tight passage 19 for conducting the electrical energy out or for passing measurement lines through. Furthermore, the wall of the battery housing 1 is provided with a vacuum port 15, in order to be able to subsequently undertake evacuation of the battery housing 1 once again after the lid segment 3a has been opened, in combination with a suitable lock installation.

Figure 6:
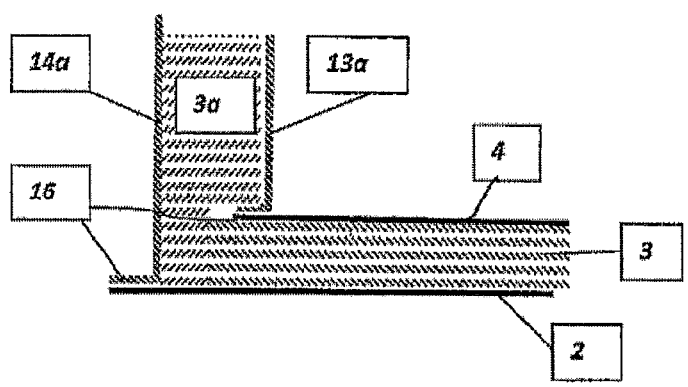
FIG. 6 is a detail of the battery housing, indicated in FIG. 5 with VI, in longitudinal section.

According to the detail view in FIG. 6, the connection between the sheet-metal parts 13a and 14a to be opened is closed off by means of a flanged seam 16, in each instance, which can be opened and closed again as needed, in accordance with the intended purpose.

Figure 7:
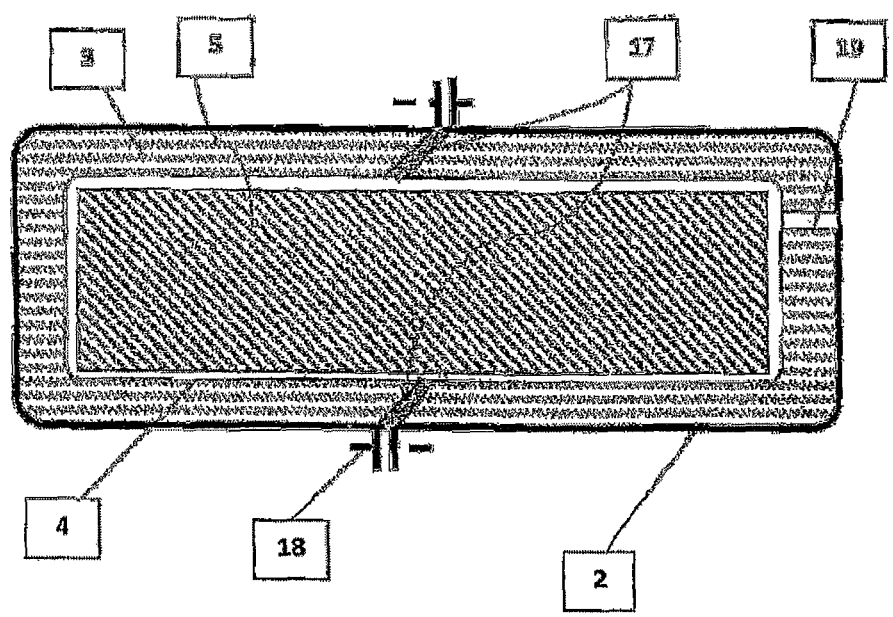
FIG. 7 shows a battery housing composed of two half-shells, in longitudinal section.

FIG. 7 finally shows a segmented battery housing 1 that encloses the cell blocks 5 on all sides, in longitudinal section. In this regard, this battery housing 1 consists of two cylindrical half-shells, which are connected with one another by means of a circumferential join 17 in the region of their abutting edges, and are connected with one another with force fit, for example by means of a screw connection 18. In this regard, this battery housing 1 is also provided with a vacuum-tight passage 19.

Although only a few embodiments of the present invention have been shown and described, it is to be understood that many changes and modifications may be made thereunto without departing from the spirit and scope of the invention.

What is claimed is:

1. A battery housing for accommodating at least one battery module, said battery housing being configured as a structural element comprising:
    (a) a plurality of wall elements forming a double-walled sandwich design comprising an inner wall and an outer wall disposed at a distance to form an interstice between the inner wall and the outer wall;
    (b) a porous support material filling each interstice; and
    (c) a plurality of cooling elements integrated into each interstice;
    wherein the inner wall and the outer wall of the battery housing are connected with one another in a connection region by way of flanged seams;
    wherein the flanged seams have flanges configured in such a manner that the connection region is openable and closable multiple times;
    wherein renewed evacuation of the battery housing is carried out by way of a vacuum port welded into the outer wall of the battery housing, in combination with a lock system; and
    wherein the structural element is evacuated and is reversibly completely encapsulated so that one side of the structural element is openable for maintenance and subsequent closure and evacuation again.

2. The battery housing according to claim 1, wherein the structural element is configured to accommodate a plurality of battery modules of a vehicle connected with one another.

3. The battery housing according to claim 1, wherein the cooling elements are disposed in at least one of the inner wall and the interstice between the inner wall and the outer wall, adjacent to the inner wall.

4. The battery housing according to claim 3, wherein the cooling elements comprise cooling ribs.

5. The battery housing according to claim 1, wherein the cooling elements are connected with a higher-level cooling system of a vehicle.

6. The battery housing according to claim 5, further comprising connections for connecting the cooling elements with the higher-level cooling system, wherein the connections are passed into the battery housing in vacuum-tight manner, all the way to the respective cooling elements.

7. The battery housing according to claim 1, further comprising a hybrid storage material or a heatable getter integrated into the support material in such a manner that if a defined temperature level is exceeded, hydrogen or another gas is emitted into the support material, thereby increasing heat conductivity of the support material.

8. The battery housing according to claim 7, further comprising latent heat storage units integrated into at least one of the interstice between the inner wall and the outer wall of the battery housing and the cooling fluid of the cooling elements.

9. The battery housing according to claim 8, wherein the latent heat storage units comprise micro-encapsulated elements integrated into the cooling fluid of the cooling elements.

10. The battery housing according to claim 8, wherein the latent heat storage units are filled with phase change materials.

11. The battery housing according to claim 8, wherein the latent heat storage units consist entirely of phase change material.

12. The battery housing according to claim 8, wherein the latent heat storage units have material properties such that when a first defined temperature level is exceeded, the latent heat storage elements automatically store heat, and when the temperature drops below a second defined, temperature level lower than the first defined temperature level, the latent heat storage elements automatically give off heat.

13. The battery housing according to claim 8, further comprising at least one thermal management device comprising a controller or a regulator for implementing thermal management with regard to interior temperature of the battery housing, in such a manner that when heat is given off from the latent heat storage units, cooling of the integrated cooling elements is shut off.

14. The battery housing according to claim 13, further comprising heat insulation wherein the heat insulation is controllable or regulatable by the thermal management device by way of at least one of controlled heating and regulated heating of the hybrid storage material or getter integrated into the support material of the interstice between the inner wall and the outer wall.

15. The battery housing according to claim 13, wherein the thermal management device is connected with a sensor system for detecting the respective vehicle states of a vehicle, and thereby the thermal management is controlled or regulated as a function of at least one of a current battery situation and a vehicle situation.

16. The battery housing according to claim 15, wherein the vehicle states comprise at least one of current engine output and current energy demand of the vehicle.

17. The battery housing according to claim 1, wherein opening and closing of a wall element of the plurality of wall elements is implemented by way of first and second elastomer-sealed flanges or blind flanges disposed one behind the other, for the inner wall and the outer wall, respectively, wherein renewed evacuation of the battery housing is carried out by way of a vacuum port welded into the outer wall, in combination with a lock system.

18. The battery housing according to claim 1, wherein the battery housing has a two-part configuration comprising separate first and second half-shells, wherein the first and second half-shells are pushable over each side of the battery module in such a manner that circumferential abutting edges between the first and second half-shells join together to form a closed battery housing, and subsequently are connected with one another with force fit, by connection elements.

19. The battery housing according to claim 2, wherein the battery housing has a two-part configuration comprising separate first and second half-shells, wherein the first and second half-shells are pushable over each side of the battery modules that are connected with one another in such a manner that circumferential abutting edges between the half-shells, with a sealing element interposed between the circumferential abutting edges, join together to form a closed battery housing, and subsequently are connected with one another with force fit by clamps or tension bands.

20. The battery housing according to claim 1, wherein the battery housing is put together from multiple cylindrical half-shells, in modular manner, and is closed off, on each side, by half-shells that are openable on only one side, wherein the half-shells that border on one another, in each instance, are connected with one another in such a manner that circumferential joins between the half-shells that border on one another come together, and are subsequently connected with one another by connection elements.

21. The battery housing according to claim 20, further comprising a seal interposed between the half-shells that border on one another.

22. The battery housing according to claim 18, wherein the cooling elements integrated into the wall elements are connected with one another by way of plug-in couplings integrated into butt joins formed by the circumferential abutting edges between the first and second half-shells, when the first and second half-shells are joined together.

23. The battery housing according to claim 18, wherein the battery housing or the half-shells individually are evacuated, in each instance, by way of a vacuum port in combination with a lock system, or by way of a pipe connector that is closed off by a pinch closure after evacuation, or by way of separate evacuation openings of the first and second half-shell closed off by soldered sheet-metal lids after evacuation.

24. The battery housing according to claim 1, further comprising electrical supply lines, measurement lines, and a cooling fluid supply, wherein the electrical supply lines, the measurement lines, and the cooling fluid supply are passed into the battery housing in vacuum-tight manner, by thin-walled pipes or a corrugated bellows.

\* \* \* \* \*